United States Patent
Pei et al.

(10) Patent No.: US 12,489,575 B2
(45) Date of Patent: Dec. 2, 2025

(54) METHOD AND APPARATUS FOR REMOTE INTERFERENCE DETECTION

(71) Applicant: Telefonaktiebolaget LM Ericsson (publ), Stockholm (SE)

(72) Inventors: Yali Pei, Beijing (CN); Sebastian Faxér, Stockholm (SE); Petter Ersbo, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 366 days.

(21) Appl. No.: 18/025,668

(22) PCT Filed: Sep. 14, 2020

(86) PCT No.: PCT/CN2020/115096
§ 371 (c)(1),
(2) Date: Mar. 10, 2023

(87) PCT Pub. No.: WO2022/052108
PCT Pub. Date: Mar. 17, 2022

(65) Prior Publication Data
US 2023/0353302 A1    Nov. 2, 2023

(51) Int. Cl.
*H04B 17/00* (2015.01)
*H04B 17/345* (2015.01)
*H04L 5/00* (2006.01)

(52) U.S. Cl.
CPC ......... *H04L 5/0048* (2013.01); *H04B 17/345* (2015.01)

(58) Field of Classification Search
CPC ... H04L 5/0048; H04L 5/0094; H04B 17/345; H04J 11/0056
See application file for complete search history.

(56) References Cited

U.S. PATENT DOCUMENTS

2020/0107227 A1*   4/2020   Xu .................. H04L 5/1469
2022/0150012 A1*   5/2022   Su .................. H04B 17/26

FOREIGN PATENT DOCUMENTS

CN   111357228 A   6/2020
CN   111436063 A   7/2020
(Continued)

OTHER PUBLICATIONS

Huawei (Huawei et al: "Discussion on reference signal design for identifying remote interference", 3GPP Draft; R1-1812217, Nov. 2018 (Nov. 11, 2018).*

(Continued)

*Primary Examiner* — Lakeram Jangbahadur
(74) *Attorney, Agent, or Firm* — Withrow & Terranova, PLLC

(57) ABSTRACT

Various embodiments of the present disclosure provide a method for remote interference detection. The method which may be performed by a first network node comprises determining a first subcarrier in a first resource of the first network node to transmit a reference signal for remote interference detection. The first subcarrier may be aligned with a second subcarrier in a second resource of a second network node. In accordance with an exemplary embodiment, the method further comprises transmitting the reference signal on the first subcarrier, according to a first reference signal sequence mapped to the first resource. The first reference signal sequence may be aligned, in an overlapped part of the first resource and the second resource, with a second reference signal sequence mapped to the second resource.

16 Claims, 13 Drawing Sheets

(56) References Cited

FOREIGN PATENT DOCUMENTS

| CN | 111556578 A | 8/2020 |
|---|---|---|
| EP | 3512106 A1 | 7/2019 |

OTHER PUBLICATIONS

Huawei (Huawei et al: "Discussion on frequency domain aspects for RIM-RS", R1-1901267, (Jan. 20, 2019)).*

Huawei, et al., "R1-1812217: Discussion on reference signal design for identifying remote interference," 3GPP TSG RAN WG1 Meeting #95, Nov. 12-16, 2018, Spokane, Washington, 11 pages.

Huawei, et al., "R1-1901267: Discussion on frequency domain aspects for RIM-RS," 3GPP TSG RAN WG1 Ad-Hoc Meeting 1901, Jan. 21-25, 2019, Taipei, Taiwan, 4 pages.

Extended European Search Report for European Patent Application No. 20952896.7, mailed Apr. 25, 2024, 8 pages.

Author Unknown, "Technical Specification Group Radio Access Network; V2X Services based on NR; User Equipment (UE) radio transmission and reception; (Release 16)," Technical Report 38.886, Version 16.0.0, Jun. 2020, 3GPP Organizational Partners, 88 pages.

Author Unknown, "Technical Specification Group Radio Access Network; NR; Physical channels and modulation (Release 16)," Technical Specification 38.211, Version 16.2.0, Jun. 2020, 3GPP Organizational Partners, 131 pages.

Ericsson, "R1-1903885: Coexistence of LTE-MTC with NR," 3GPP TSG RAN WG1 Meeting #96bis, Apr. 8-12, 2019, Xi'an, China, 17 pages.

Huawei, et al., "R1-1808067: Discussion on remote interference mitigation mechanisms," 3GPP TSG RAN WG1 Meeting #94, Aug. 20-24, 2018, 4 pages.

International Search Report and Written Opinion for International Patent Application No. PCT/CN2020/115096, mailed Jun. 11, 2021, 9 pages.

* cited by examiner

METHOD AND APPARATUS FOR REMOTE INTERFERENCE DETECTION

This application is a 35 U.S.C. § 371 national phase filing of International Application No. PCT/CN2020/115096, filed Sep. 14, 2020, the disclosure of which is incorporated herein by reference in its entirety.

FIELD OF THE INVENTION

The present disclosure generally relates to communication networks, and more specifically, to a method and apparatus for remote interference detection.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long term evolution (LTE)/fourth generation (4G) networks and new radio (NR)/fifth generation (5G) networks are expected to achieve high traffic capacity and end-user data rate with lower latency. Various signal propagation environments in the wireless communication networks may have different effects on signal transmission performance of communication devices. For example, the signal propagation environment may vary with weather conditions and geographic regions, etc., which may cause various potential interferences to the communication devices. Considering the diversity of network deployments and communication scenarios, configuration of radio resources and detection of potential interferences may become more challenging.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Under certain weather conditions, lower densities at higher altitudes in the Earth's atmosphere may cause a reduced refractive index, bending signals back towards the earth. Under such circumstances, signals can propagate in a higher refractive index layer, i.e., the atmospheric duct, since the reflection and refraction are encountered at the boundary with a lower refractive index material. In this mode of propagation, which is dubbed as the atmospheric ducting, radio signals may experience less attenuation, and may be guided over distances far greater than the normal radiate range. In this case, the downlink signals of a first cell may travel a long distance and interfere with the uplink signals of a second cell that is far away from the first cell. Such interference is termed as "remote interference" in the 3rd generation partnership project (3GPP). In order to determine whether the remote interference exists between the first cell and the second cell, the second cell may detect a reference signal transmitted in the downlink of the first cell. If the reference signal transmitted by the first cell can be detected by the second cell, it means that the remote interference exists. According to the existing solutions, detection of the remote interference may require that both the first and second cells have the same bandwidth and the same central carrier frequency. However, radio resources configured for different cells may not overlap completely in many cases, resulting in remote interference detection not being supported. Therefore, it may be desirable to implement remote interference detection in a more efficient way.

Various embodiments of the present disclosure propose a solution for remote interference detection, which can enable a network node or a cell to detect remote interference from other network node(s) or cell(s) in different communication scenarios, e.g., when resources of the network nodes or the cells are partially overlapped, so as to improve flexibility of resource configuration and enhance network performance.

It can be appreciated that the term "resource" mentioned in this document may refer to "spectrum", "band" or "carrier" configured for a network node or a cell, and these terms may be used interchangeably in this document.

According to a first aspect of the present disclosure, there is provided a method performed by a first network node (e.g., a base station). The method comprises determining a first subcarrier in a first resource of the first network node to transmit a reference signal for remote interference detection. The first subcarrier may be aligned with a second subcarrier in a second resource of a second network node. In accordance with an exemplary embodiment, the method further comprises transmitting the reference signal on the first subcarrier, according to a first reference signal sequence mapped to the first resource. The first reference signal sequence may be aligned, in an overlapped part of the first resource and the second resource, with a second reference signal sequence mapped to the second resource.

In accordance with an exemplary embodiment, the first resource may overlap the second resource partially or completely.

In accordance with an exemplary embodiment, the first resource and the second resource may be aligned on subcarriers.

In accordance with an exemplary embodiment, the first reference signal sequence and the second reference signal sequence may have the same sequence index per subcarrier in the overlapped part of the first resource and the second resource.

In accordance with an exemplary embodiment, the first resource may correspond to a first central frequency and the second resource may correspond to a second central frequency. In an embodiment, the second central frequency may have a first offset with respect to the first central frequency by an integer multiple of a subcarrier spacing for the remote interference detection.

In accordance with an exemplary embodiment, the first resource may correspond to a first absolute radio frequency channel number (ARFCN) and the second resource may correspond to a second ARFCN. In an embodiment, the second ARFCN may have a second offset with respect to the first ARFCN, and the second offset may be determined based at least in part on the first offset and a channel raster value.

In accordance with an exemplary embodiment, the first network node and the second network node may have a common frequency reference point to determine a first central frequency of the first resource and a second central frequency of the second resource.

In accordance with an exemplary embodiment, the first central frequency may have a first frequency difference from the common frequency reference point by an integer multiple of a subcarrier spacing for the remote interference detection. The second central frequency may have a second frequency difference from the common frequency reference point by an integer multiple of the subcarrier spacing for the remote interference detection.

In accordance with an exemplary embodiment, the first reference signal sequence may have a first start sequence index based at least in part on the common frequency reference point.

In accordance with an exemplary embodiment, the second reference signal sequence may have a second start sequence index based at least in part on the common frequency reference point.

In accordance with an exemplary embodiment, the first reference signal sequence may be obtained according to remote interference management reference signal (RIM-RS) generation, or by performing frequency division multiplexing (FDM) on a first fixed-length sequence.

In accordance with an exemplary embodiment, the second reference signal sequence may be obtained according to RIM-RS generation, or by performing FDM on a second fixed-length sequence.

According to a second aspect of the present disclosure, there is provided an apparatus which may be implemented as a first network node. The apparatus may comprise one or more processors and one or more memories storing computer program codes. The one or more memories and the computer program codes may be configured to, with the one or more processors, cause the apparatus at least to determine a first subcarrier in a first resource of the first network node to transmit a reference signal for remote interference detection. The first subcarrier may be aligned with a second subcarrier in a second resource of a second network node. According to some exemplary embodiments, the one or more memories and the computer program codes may be configured to, with the one or more processors, cause the apparatus at least further to transmit the reference signal on the first subcarrier, according to a first reference signal sequence mapped to the first resource. The first reference signal sequence may be aligned, in an overlapped part of the first resource and the second resource, with a second reference signal sequence mapped to the second resource.

In accordance with some exemplary embodiments, the one or more memories and the computer program codes may be configured to, with the one or more processors, cause the apparatus according to the second aspect of the present disclosure at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first network node. The apparatus may comprise a determining unit and a transmitting unit. In accordance with some exemplary embodiments, the determining unit may be operable to carry out at least the determining step of the method according to the first aspect of the present disclosure. The transmitting unit may be operable to carry out at least the transmitting step of the method according to the first aspect of the present disclosure.

According to a fifth aspect of the present disclosure, there is provided a method performed by a second network node (e.g., a base station). The method comprises determining a second subcarrier in a second resource of the second network node to receive a reference signal for remote interference detection. The second subcarrier may be aligned with a first subcarrier in a first resource of a first network node. In accordance with an exemplary embodiment, the method further comprises receiving the reference signal on the second subcarrier from the first network node, according to a second reference signal sequence mapped to the second resource. The second reference signal sequence may be aligned, in an overlapped part of the first resource and the second resource, with a first reference signal sequence mapped to the first resource.

In accordance with an exemplary embodiment, the reference signal for remote interference detection described according to the fifth aspect of the present disclosure may correspond to the reference signal for remote interference detection described according to the first aspect of the present disclosure.

In accordance with an exemplary embodiment, the first resource/subcarrier/reference signal sequence described according to the fifth aspect of the present disclosure may correspond to the first resource/subcarrier/reference signal sequence described according to the first aspect of the present disclosure. Similarly, the second resource/subcarrier/reference signal sequence described according to the fifth aspect of the present disclosure may correspond to the second resource/subcarrier/reference signal sequence described according to the first aspect of the present disclosure.

According to a sixth aspect of the present disclosure, there is provided an apparatus which may be implemented as a second network node. The apparatus comprises one or more processors and one or more memories storing computer program codes. The one or more memories and the computer program codes may be configured to, with the one or more processors, cause the apparatus at least to determine a second subcarrier in a second resource of the second network node to receive a reference signal for remote interference detection. The second subcarrier may be aligned with a first subcarrier in a first resource of a first network node. According to some exemplary embodiments, the one or more memories and the computer program codes may be configured to, with the one or more processors, cause the apparatus at least further to receive the reference signal on the second subcarrier from the first network node, according to a second reference signal sequence mapped to the second resource. The second reference signal sequence may be aligned, in an overlapped part of the first resource and the second resource, with a first reference signal sequence mapped to the first resource.

In accordance with some exemplary embodiments, the one or more memories and the computer program codes may be configured to, with the one or more processors, cause the apparatus according to the sixth aspect of the present disclosure at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a second network node. The apparatus may comprise a determining unit and a receiving unit. In accordance with some exemplary embodiments, the determining unit may be operable to carry out at least the determining step of the method according to the fifth aspect of the present disclosure. The receiving unit may be operable to carry out at least the receiving step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
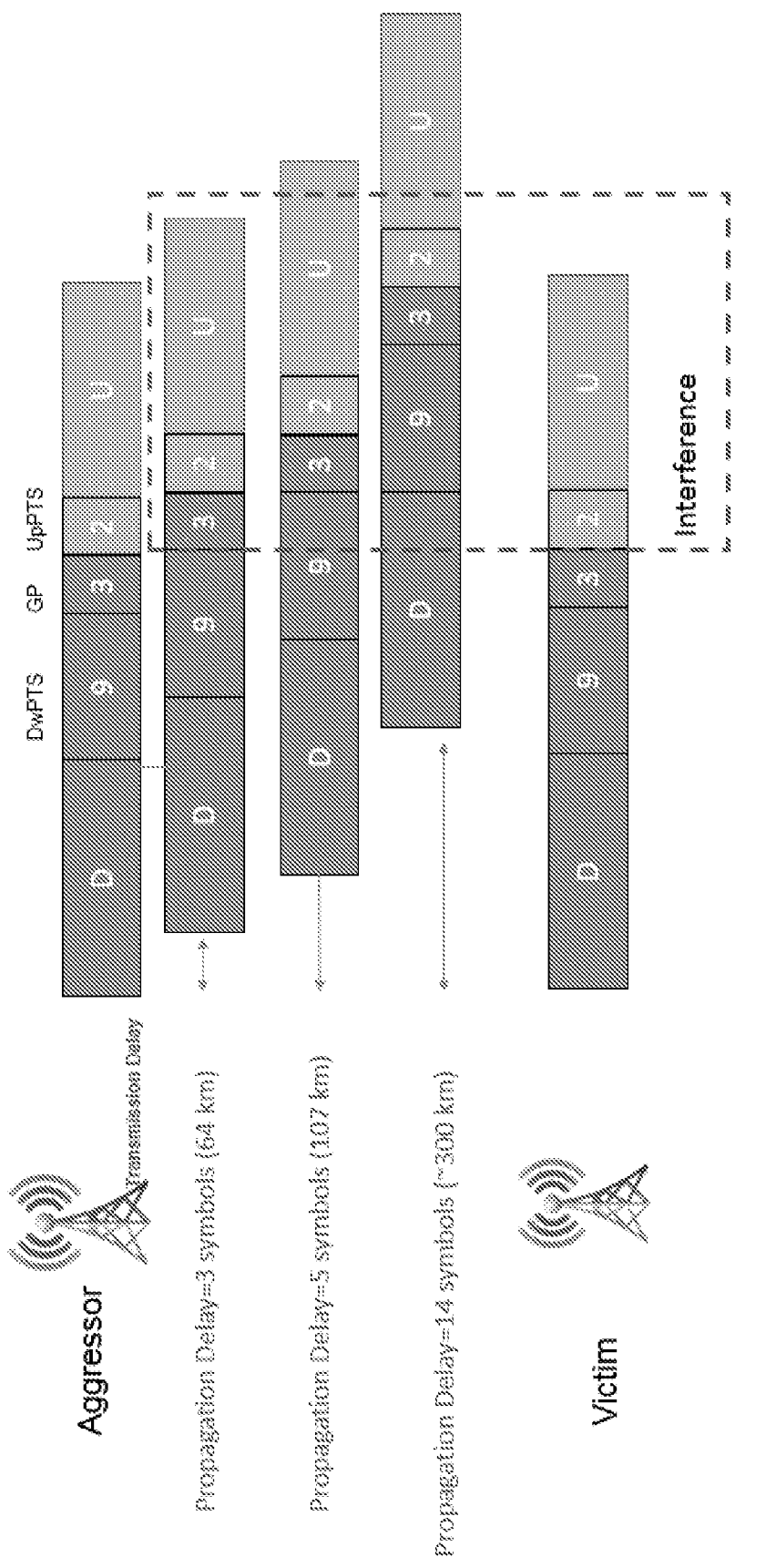
FIG. 1A is a diagram illustrating exemplary remote interference according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device (e.g., a user equipment (UE), a mobile station (MS), a portable communication device, etc.) accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. 5G/NR technology may be used for the 5th generation cellular mobile systems that can provide improved performance related to data rate, coverage and capacity compared to legacy 4G/LTE systems. The changes in weather conditions and the diversity of the geographical environments may have different effects on radio signal propagation in the wireless communication networks. For example, the atmospheric ducting phenomenon may usually happen during the transition periods between spring and summer and between summer and autumn for inland areas, and during winter seasons for coastal areas. The frequency range which may be usually influenced by this phenomenon is around 0.3 GHz-30 GHz.

FIG. 1A is a diagram illustrating exemplary remote interference according to some embodiments of the present disclosure. In a time division duplex (TDD) network (e.g., a time division-long term evolution (TD-LTE) network, etc.) with the same configuration of uplink-downlink transmission direction, a gap may be used to avoid the cross-link interference. As shown in FIG. 1A, an aggressor base station and a victim base station have the same frame configuration, including downlink subframe (D), downlink pilot time slot (DwPTS), guard period (GP), uplink pilot time slot (UpPTS), and uplink subframe (U). When the atmospheric ducting phenomenon happens, radio signals can travel a relatively long distance, and the propagation delay may go beyond the gap. In this case, the downlink signals of the aggressor base station may be still strong after hundreds of kilometers transmission (transmission delay>GP), causing severe interference to uplink reception of the victim base station that is far away from the aggressor base station, as indicated by the dotted box in FIG. 1A. This kind of interference (also called remote interference) may impact the uplink performance of the victim base station.

A possible way to solve this problem may be to insert a reference signal of some kind of sequence into the frame, then a cell or base station can perform detection of the reference signal from other cell(s) or base station(s). If the reference signal can be detected, it indicates that the remote interference may exist. 3GPP defines such reference signal as "remote interference management reference signal (RIM-RS)" to support remote interference detection in a NR network. The RIM-RS may support 15 kHz/30 kHz subcarrier spacing which may be configured by the network and independent of physical uplink shared channel (PUSCH) subcarrier spacing. The remote interference detection between cells may be performed in some scenarios, e.g., when both cells have the same bandwidth and the same central carrier frequency (also called central frequency), or when both cells have the same bandwidth and different central frequencies.

Figure 1B:
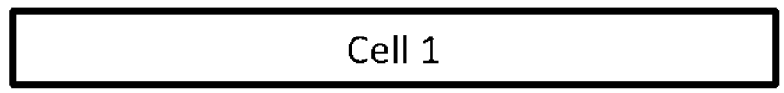
FIGS. 1B-1C are diagrams illustrating exemplary cell deployment according to some embodiments of the present disclosure.
Figure 1C:
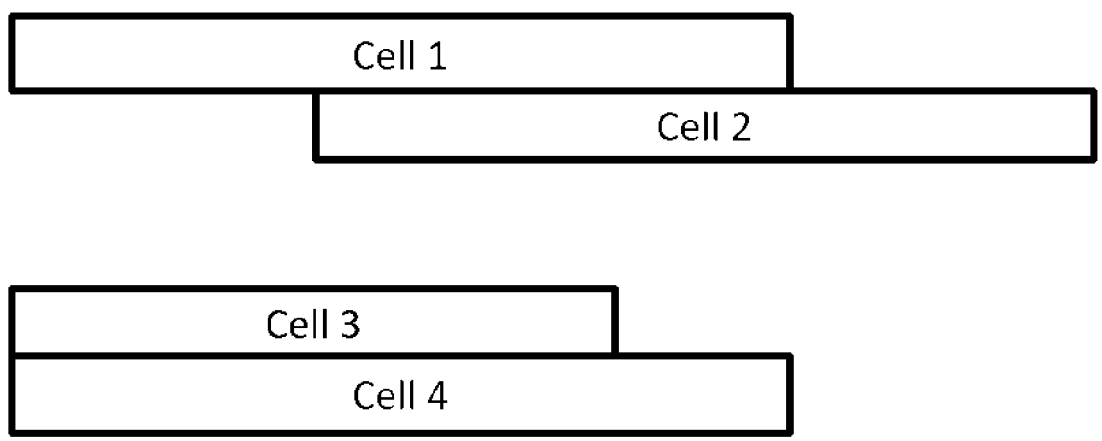

FIGS. 1B-1C are diagrams illustrating exemplary cell deployment according to some embodiments of the present disclosure. In FIG. 1B, different cells (i.e., Cell 1, Cell 2, Cell 3 and Cell 4) have totally overlapped deployment. In FIG. 1C, Cell 1 and Cell 2 have the same bandwidth and partially overlapped deployment, and Cell 3 and Cell 4 have different bandwidths and partially overlapped deployment. The existing solutions for remote interference detection may only be supported in the cell deployment as shown in FIG. 1B.

For the reference signal of some kind of sequence for remote interference detection, the sequence mapping in frequency domain of the existing solutions including the framework in 3GPP for NR are not considered for partially overlapped deployment scenarios (e.g., as shown in FIG. 1C). However, the totally overlapped deployment as shown in FIG. 1B may not be implemented in all network configurations. Partially overlapped deployment as shown in FIG. 1C may possibly happen in most cases.

Figure 1D:
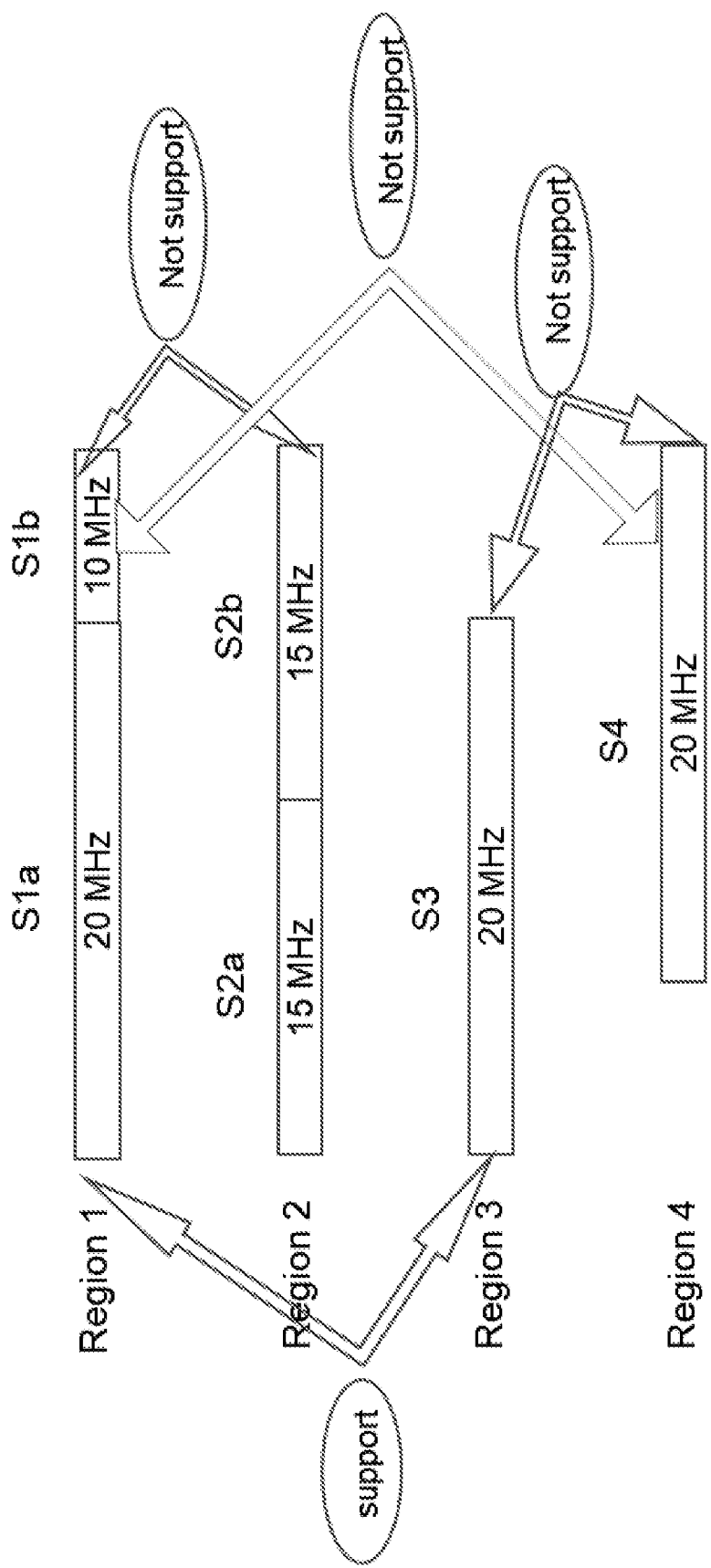
FIG. 1D is a diagram illustrating exemplary spectrum deployment scenarios according to some embodiments of the present disclosure.

FIG. 1D is a diagram illustrating exemplary spectrum deployment scenarios according to some embodiments of the present disclosure. As shown in FIG. 1D, four regions (i.e., Region 1, Region 2, Region 3 and Region 4) are configured with different spectrums, including spectrum S1$a$ of 20 MHz and spectrum S1$b$ of 10 MHz for Region 1, spectrum S2$a$ of 15 MHz and spectrum S2$b$ of 15 MHz for Region 2, spectrum S3 of 20 MHz for Region 3, and spectrum S4 of 20 MHz for Region 4. In the deployment as shown in FIG. 1D, only two spectrums S1$a$ and S3 are totally overlapped, and thus Region 1 and Region 3 can detect the remote interference to each other in the overlapped spectrum part by using the existing solutions. For other cases where two spectrums are partially overlapped, the remote interference detection may not be supported by the existing solutions.

In accordance with an exemplary embodiment, the carrier frequency in the uplink/downlink may be designated by the evolved-universal terrestrial radio access (E-UTRA) absolute radio frequency channel number (EARFCN) in the range of 0~262143. As an example, the relation between EARFCN and the carrier frequency $F_{DL}$ in MHz for the downlink may be determined by the following formula:

$$F_{DL}=F_{DL\_low}+0.1(N_{DL}-N_{Offs-DL}) \quad (1)$$

where $F_{DL\_low}$ and $N_{Offs-DL}$ are fixed values in a specific band, and $N_{DL}$ is the downlink EARFCN. It can be appreciated that the relation between EARFCN $N_{UL}$ and the carrier frequency $F_{UL}$ in MHz for the uplink may also be determined in a similar way. Some exemplary values of uplink/downlink parameters for the E-UTRA operating band are given in Table 1.

TABLE 1

| E-UTRA | Downlink | | | Uplink | | |
|---|---|---|---|---|---|---|
| Operating Band | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |

TABLE 1-continued

| E-UTRA Operating Band | Downlink $F_{DL\_low}$ (MHz) | $N_{Offs-DL}$ | Range of $N_{DL}$ | Uplink $F_{UL\_low}$ (MHz) | $N_{Offs-UL}$ | Range of $N_{UL}$ |
|---|---|---|---|---|---|---|
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| 27 | 852 | 9040 | 9040-9209 | 807 | 27040 | 27040-27209 |
| 28 | 758 | 9210 | 9210-9659 | 703 | 27210 | 27210-27659 |
| 29[2] | 717 | 9660 | 9660-9769 | | N/A | |
| 30 | 2350 | 9770 | 9770-9869 | 2305 | 27660 | 27660-27759 |
| 31 | 462.5 | 9870 | 9870-9919 | 452.5 | 27760 | 27760-27809 |
| 32[2] | 1452 | 9920 | 9920-10359 | | N/A | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |
| 44 | 703 | 45590 | 45590-46589 | 703 | 45590 | 45590-46589 |
| 45 | 1447 | 46590 | 46590-46789 | 1447 | 46590 | 46590-46789 |
| 46[4] | 5150 | 46790 | 46790-54539 | 5150 | 46790 | 46790-54539 |
| ... | | | | | | |
| 64 | | | Reserved | | | |
| 65 | 2110 | 65536 | 65536-66435 | 1920 | 131072 | 131072-131971 |
| 66[5] | 2110 | 66436 | 66436-67335 | 1710 | 131972 | 131972-132671 |
| 67[2] | 738 | 67336 | 67336-67535 | | N/A | |
| 68 | 753 | 67536 | 67536-67835 | 698 | 132672 | 132672-132971 |
| 69[2] | 2570 | 67836 | 67836-68335 | | N/A | |
| 70 | 1995 | 68336 | 68336-68485 | 1695 | 132972 | 132972-133221 |

In a NR network, a global frequency raster may be defined for all frequencies from 0 to 100 GHz. The granularity of the global frequency raster is $\Delta F_{Global}$. Radio frequency (RF) reference frequencies may be designated by a NR absolute radio frequency channel number (NR-ARFCN) in the range of 0~2016666 on the global frequency raster. In an embodiment, the relation between the NR-ARFCN and the RF reference frequency $F_{REF}$ in MHz may be determined by the following formula:

$$F_{REF} = F_{REF-Offs} + \Delta F_{Global}(N_{REF} - N_{REF-Offs}) \quad (2)$$

where $F_{REF-Offs}$ and $N_{REF-Offs}$ are fixed values in a specific band, and $N_{REF}$ is the NR-ARFCN. Some exemplary values of $F_{REF-Offs}$ and $N_{REF-Offs}$ are given in Table 2.

TABLE 2

| Frequency range (MHz) | $\Delta F_{Global}$ (kHz) | $F_{REF-Offs}$ (MHz) | $N_{REF-Offs}$ | Range of NREF |
|---|---|---|---|---|
| 0-3000 | 5 | 0 | 0 | 0-599999 |
| 3000-24250 | 15 | 3000 | 600000 | 600000-2016666 |

In accordance with an exemplary embodiment, for the NR operating band with 100 kHz channel raster, the relation between the channel raster $\Delta F_{Raster}$ and the global frequency raster $\Delta F_{Global}$ may be determined by the following equation:

$$\Delta F_{Raster} = 20 \times \Delta F_{Global} \quad (3)$$

In this case, every 20th NR-ARFCN within the operating band may be applicable for the channel raster within the operating band and the step size for the channel raster is 20. As an example, the RF channel positions on the channel raster in each NR operating band are given through the applicable NR-ARFCN in Table 3.

TABLE 3

| NR operating band | $\Delta F_{Raster}$ (kHz) | Uplink Range of $N_{REF}$ (First-<Step size>-Last) | Downlink Range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n14 | 100 | 157600-<20>-159600 | 151600-<20>-153600 |
| n18 | 100 | 163000-<20>-166000 | 172000-<20>-175000 |
| n20 | 100 | 166400-<20>-172400 | 158200-<20>-164200 |
| n25 | 100 | 370000-<20>-383000 | 386000-<20>-399000 |
| n26 | 100 | 162800-<20>-169800 | 171800-<20>-178800 |
| n28 | 100 | 140600-<20>-149600 | 151600-<20>-160600 |
| n29 | 100 | N/A | 143400-<20>-145600 |
| n30 | 100 | 461000-<20>-463000 | 470000-<20>-472000 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |

For the LTE network, the channel raster for EARFCN configuration is 100 kHz, and for the NR network, the channel raster may also be 100 kHz, depending on which band it is. Since the subcarrier spacing is 15 kHz for the LTE network or the multiple of 15 kHz for the NR network, and 100 kHz is not the multiple of 15 kHz, there may be problems when remote interference detection is performed between two cells whose central carrier frequencies are not aligned on subcarriers. If the cells are not aligned on subcarriers, there may be 50 kHz/100 kHz frequency offset between the transmitted RIM sequence and the received RIM sequence, which may impact the correlation peak power, then impact the network performance.

Figure 1E:
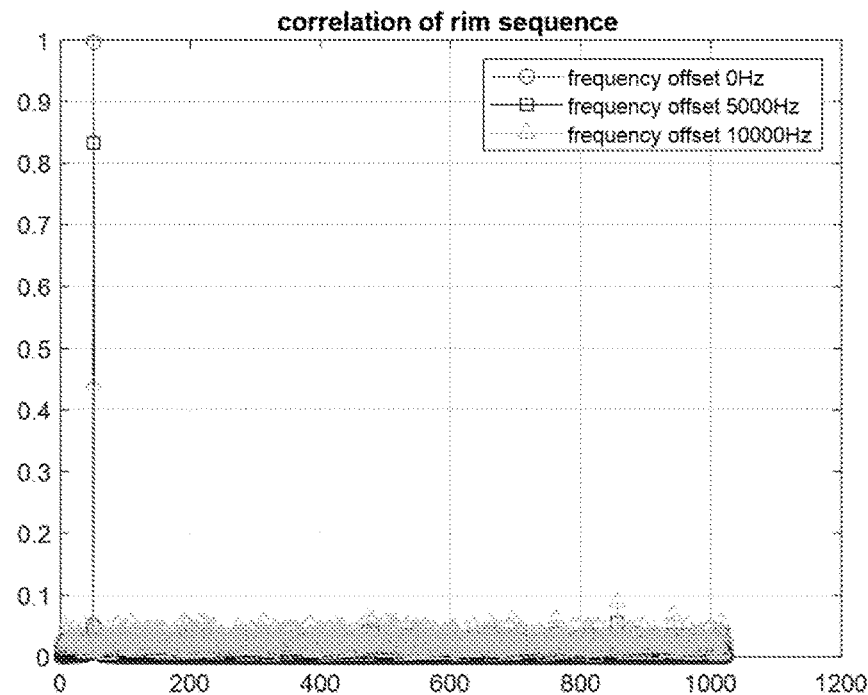
FIG. 1E is a diagram illustrating exemplary correlation of sequences with different frequency offsets according to an embodiment of the present disclosure.

FIG. 1E is a diagram illustrating exemplary correlation of sequences with different frequency offsets according to an embodiment of the present disclosure. As shown in FIG. 1E, when there is no frequency offset (i.e., frequency offset of 0 Hz) between two RIM sequences, the correlation of sequences is 1. If the frequency offset between the two sequences is 5 kHz, the correlation of sequences is less than 0.9 and larger than 0.8. If the frequency offset between the two sequences is 10 kHz, the correlation of sequences is less than 0.5 and larger than 0.4. That is to say, the correlation between RIM sequences may decrease when there is frequency offset between the sequences.

Figure 1F:
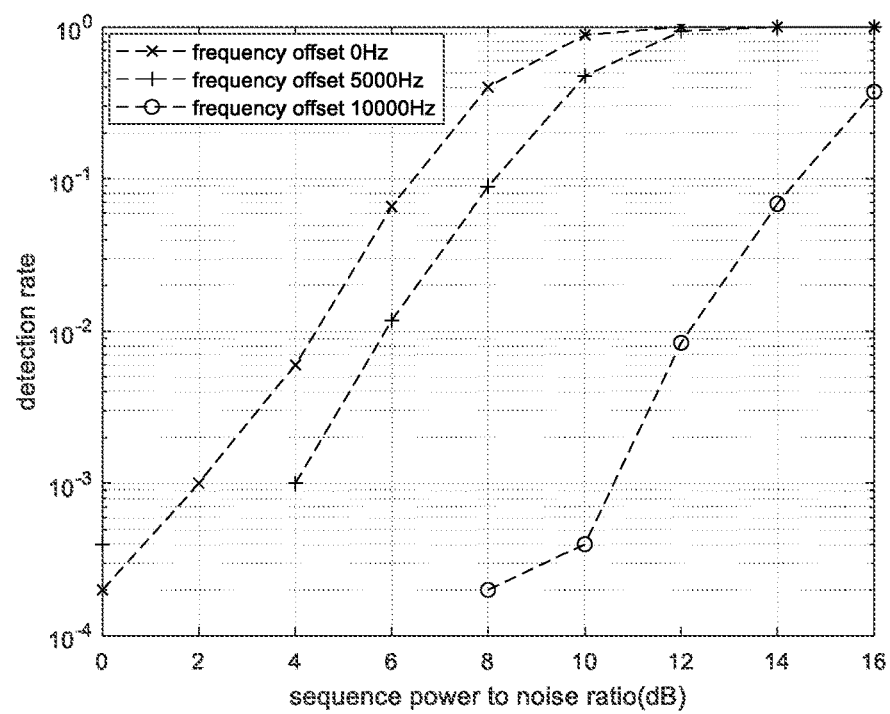
FIG. 1F is a diagram illustrating exemplary interference detection performance with different frequency offsets according to an embodiment of the present disclosure.

FIG. 1F is a diagram illustrating exemplary interference detection performance with different frequency offsets according to an embodiment of the present disclosure. As shown in FIG. 1F, the detection rate increases with the increase of sequence power to noise ratio. For the same sequence power to noise ratio, the detection performance may decrease when there exists frequency offset.

Various exemplary embodiments of the present disclosure propose a solution to enable remote interference detection in a communication network (e.g., a TD-LTE network, a TDD NR network, etc.), especially when radio resources (e.g., spectrums, bands, carriers, etc.) of cells are partially overlapped. With the existing solutions, it may be impossible to do remote interference detection in some scenarios where the bandwidths of an aggressor cell and a victim cell are different, or the central frequencies of the aggressor cell and the victim cell are different. The proposed solution according to various exemplary embodiments can support remote interference detection in the scenarios where resources of the aggressor cell and the victim cell are partially overlapped. Thus, even if the bandwidths of the aggressor cell and the victim cell may be different, remote interference from the aggressor cell may be detected by the victim cell in a cross-bandwidth way. In accordance with an exemplary embodiment, the cross-bandwidth remote interference detection may be performed based at least in part on subcarrier alignment and sequence alignment.

Figure 2:
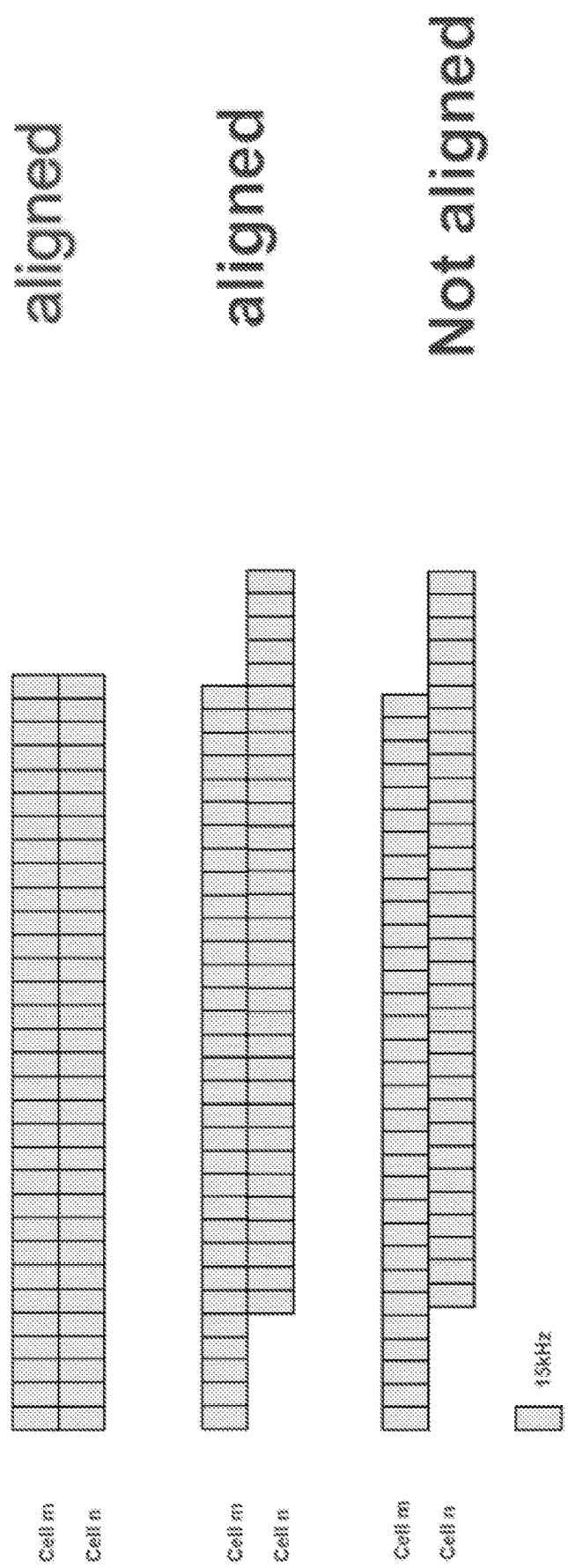
FIG. 2 is a diagram illustrating examples of aligned and non-aligned spectrums according to some embodiments of the present disclosure.

FIG. 2 is a diagram illustrating examples of aligned and non-aligned spectrums according to some embodiments of the present disclosure. As shown in FIG. 2, spectrums of different cells (e.g., Cell m and Cell n) may be aligned on subcarriers or not aligned. Although the bandwidth of Cell m is the same as the bandwidth of Cell n in the embodiments of FIG. 2, it can be appreciated that the bandwidths of various cells may be different according to network configurations. The subcarrier spacing for an LTE network may be 15 kHz and the subcarrier spacing for a NR network may be 15 kHz/30 kHz. In the case that the subcarriers of two cells are aligned (e.g., orthogonal), a central frequency offset $\Delta_{inter-cell}^{freq}$ between the two cells (where one of the two cells may act as a RIM-RS transmitter and the other may act as a RIM-RS receiver) may be determined according to the following formula:

$$\Delta_{inter-cell}^{freq} \bmod \Delta F_{SCS} = 0 \quad (4)$$

where $\Delta F_{SCS}$ is the subcarrier spacing supported by the RIM-RS, which may be 15 kHz or any other suitable values. If the spectrums are not aligned on subcarriers, there may be a central frequency offset between the RIM-RS transmitter and the RIM-RS receiver, then the correlation performance of RIM sequences may decrease (e.g., as shown in FIG. 1E), degrading the interference detection rate (e.g., as shown in FIG. 1F). As an example, for different central frequency offsets, the possible offsets between subcarriers may be 0 kHz, 5 kHz and 10 kHz, as given in Table 4.

TABLE 4

| Offset between central frequencies | Offset between subcarriers |
|---|---|
| 0 | 0 kHz |
| 100 kHz | 10 kHz |
| 200 kHz | 5 kHz |
| 300 kHz | 0 kHz |
| . | . |
| . | . |
| . | . |
| j*300 kHz + 100 kHz | 10 kHz |
| j*300 kHz + 200 kHz | 5 kHz |
| (j + 1)*300 kHz | 0 Hz |
| . | . |
| . | . |
| . | . |

Note:
j = 0, 1, 2, . . . , which is a nonnegative integer.

In accordance with an exemplary embodiment, it may be needed to carefully select an EARFCN to make different cells in the LTE network aligned on subcarriers. According to the relation between the EARFCN and the carrier frequency in MHz as shown in formula (1), the carrier frequency $F_{DL}^{cell1}$ in MHz for the downlink of Cell 1 and the carrier frequency $F_{DL}^{cell2}$ in MHz for the downlink of Cell 2 may be respectively calculated as below:

$$F_{DL}^{cell1} = F_{DL,low} + 0.1(N_{DL}^{cell1} - N_{offs-DL}) \quad (5)$$

$$F_{DL}^{cell2} = F_{DL,low} + 0.1(N_{DL}^{cell2} - N_{offs-DL}) \quad (6)$$

where $N_{DL}^{cell1}$ is the downlink EARFCN of Cell 1 and $N_{DL}^{cell2}$ is the downlink EARFCN of Cell 2. The central frequency offset $\Delta_{inter-cell}^{freq}$ between two cells may be determined as below:

$$\Delta_{inter-cell}^{freq} = F_{DL}^{cell1} - F_{DL}^{cell2}$$
$$= 0.1 \times \left(N_{DL}^{cell1} - N_{DL}^{cell2}\right) \text{ MHz}$$
$$= 100 \times \left(N_{DL}^{cell1} - N_{DL}^{cell2}\right) \text{ kHz}$$

i.e. $\Delta_{inter-cell}^{freq} = 0.1 \times \Delta_{inter-cell}^{EARFCN}$ MHz $= 100 \times \Delta_{inter-cell}^{EARFCN}$ kHz (7)

where $\Delta_{inter-cell}^{EARFCN}$ indicates the EARFCN difference between Cell 1 and Cell 2, i.e. $\Delta_{inter-cell}^{EARFCN} = N_{DL}^{cell1} - N_{DL}^{cell2}$.

In order to implement subcarrier alignment, $\Delta_{inter-cell}^{freq}$ may need to be an integer multiple of subcarrier spacing (e.g., 15 kHz/30 kHz), and considering 100 is multiple of 10, $\Delta_{inter-cell}^{EARFCN}$ may need to be integer multiple of 3.

$$\Delta_{inter-cell}^{EARFCN} \bmod 3 = 0 \quad (8)$$

For the NR network, when the channel raster is 100 kHz, the central frequency offset between two cells may be obtained in a similar way as shown in formula (7), e.g., according to the relation between NR-ARFCN and the carrier frequency as shown in formula (2). In an embodiment, the selection of EARFCN/NR-ARFCN according to formula (8) may enable the cross-bandwidth detection of remote interference between Cell 1 and Cell 2. That is to say, one of Cell 1 and Cell 2 may be able to detect the remote interference from the other, even if the bandwidths of the two cells are different and/or the spectrums of the two cells are not totally overlapped.

In accordance with an exemplary embodiment, the RIM sequences of Cell 1 and Cell 2 may be the same in the overlapped spectrum part of the two cells, so that the cross-bandwidth detection of remote interference may be performed between Cell 1 and Cell 2. In this case, the mapping of RIM sequence in a cell may be correlated with the absolute frequency and not a subcarrier index within the cell. To achieve this, a common frequency reference point (also called "common reference point" in this document) may be configured for all cells. In an embodiment, a difference between the common frequency reference point and the central carrier frequency of any cell may be an integer multiple of subcarrier spacing (e.g., 15 kHz/30 kHz, etc.), so that $\Delta_{inter-cell}^{EARFCN}$ may be kept as an integer multiple of 3.

Figure 3:
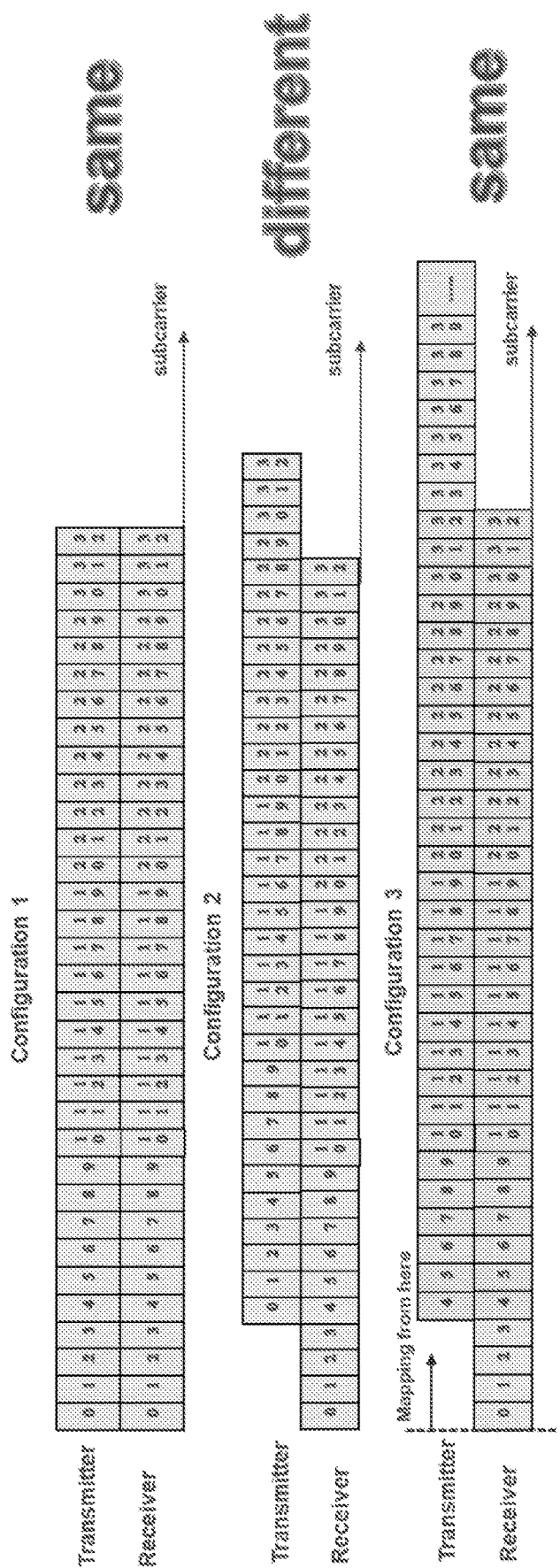
FIG. 3 is a diagram illustrating exemplary scenarios of sequence mapping according to some embodiments of the present disclosure.

FIG. 3 is a diagram illustrating exemplary scenarios of sequence mapping according to some embodiments of the present disclosure. As shown in FIG. 3, the RIM sequences in the overlapped spectrum part of a transmitter (e.g., Cell 1) and a receiver (e.g., Cell 2) may be the same in Configuration 1 and Configuration 3, while the RIM sequences in the overlapped spectrum part of a transmitter and a receiver are different in Configuration 2. According to Configurations 1 and 3, different cells may use the same RIM sequence to perform remote interference detection, thus the correlation of sequences may be large and the performance of remote interference detection may be good. In Configuration 3 of FIG. 3, the spectrums of the transmitter and the receiver are partially overlapped, which is different from Configuration 1 where the spectrums of the transmitter and the receiver are totally overlapped. In order to achieve sequence alignment, a common frequency reference point may be introduced in Configuration 3. According to the common frequency reference point, the actual start index of the RIM sequence which may be mapped to the transmitter/receiver may be determined to be 0 (e.g., for the receiver in Configuration 3 of FIG. 3) or other values (e.g., "4" for the transmitter in Configuration 3 of FIG. 3).

Figure 4:
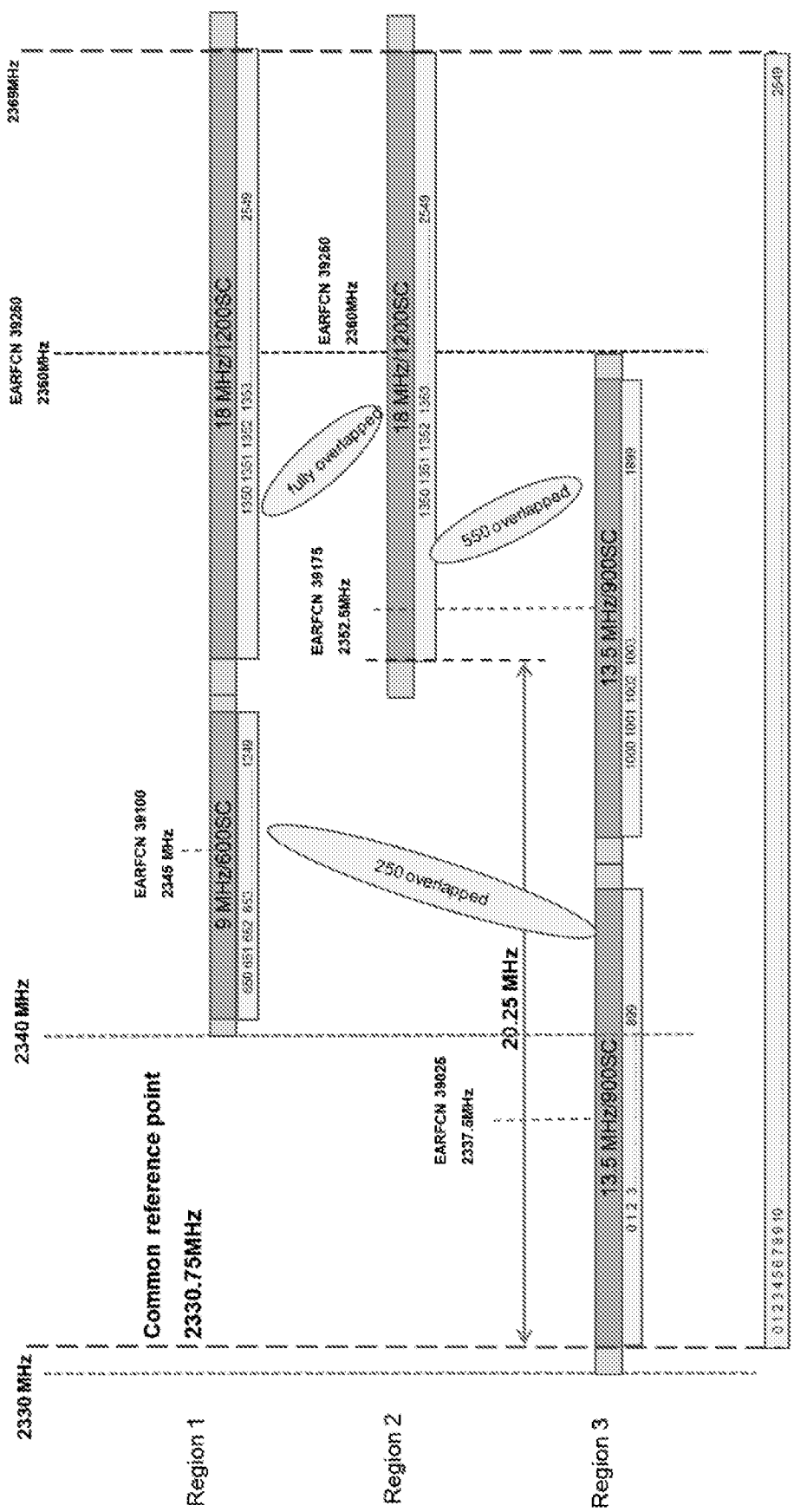
FIG. 4 is a diagram illustrating an exemplary common frequency reference point according to an embodiment of the present disclosure.

FIG. 4 is a diagram illustrating an exemplary common frequency reference point according to an embodiment of the present disclosure. As shown in FIG. 4, the common frequency reference point is set to 2330.75 MHz. For the subcarrier spacing of 15 kHz, a RIM sequence with length of 2550 (as indicated by sequence indexes of 0~2549 in FIG. 4) may be mapped into subcarriers of a spectrum of 2330.75 MHz~2369 MHz. Different regions (e.g., Region 1, Region 2 and Region 3 served by different cells) may be configured with different resources which may be aligned on subcarriers and have the corresponding sequence mapping.

In accordance with an exemplary embodiment, a RIM sequence may be mapped into subcarriers of cell i by calculating a frequency offset of the cell with respect to the common frequency reference point. First, the mapping offset $k_{offset}^{cell\_i}$ a reference signal of the RIM sequence for cell i may be calculated as below:

$$k_{offset}^{cell\_i} = (f_{cell\_i}^{left\ edge} - f_{specific\ band}^{common\ reference\ point})/\Delta F_{SCS} \quad (9)$$

where $f_{cell\_i}^{left\ edge}$ is the lowest frequency of the spectrum configured for cell i, $f_{specific\ band}^{common\ reference\ point}$ is the common frequency reference point configured for a specific band by the network, and $\Delta F_{SCS}$ is the subcarrier spacing supported by the RIM-RS, which may be 15 kHz, 30 kHz or any other suitable values.

According to mapping offset $k_{offset}^{cell\_i}$, the actual start $k_{start}$ of the RIM sequence which may be mapped into the subcarriers of cell i may be calculated as below:

$$k_{start} = k_{offset}^{cell\_i} \bmod L^{seq} \quad (10)$$

where $L^{seq}$ is the length of a predefined reference signal sequence (e.g., a RIM sequence for which the frequency division multiplexing (FDM) is not performed). It can be appreciated that although the common frequency reference point may be possibly set in the middle part of the spectrum of a cell, which means $k_{offset}^{cell\_i}$ may be a negative number, a positive integer $k_{start}$ can still be obtained after the "mod" operation in formula (10).

Then according to the subcarrier number $L_{cell\_i}^{sc}$ of cell i, the RIM sequence may be mapped into the subcarriers of cell i as below:

$$r_i^{cell_i}(k) = \begin{cases} r_i(k'), k' = k + k_{start}, k + k_{start} + 1, \ldots, L^{seq} - 1; \\ \quad \text{and } 0 \le k \le L^{seq} - k_{start} - 1 \\ r_i(k'), k' = 0, \ldots, k_{start} - 1; \\ \quad \text{and } L^{seq} - k_{start} \le k \le L_{cell\_i}^{sc} \end{cases} \quad (11)$$

where $r_i^{cell_i}(k)$ represents the sequence which is mapped to the subcarriers of cell i, k is the index of sequence $r_i^{cell_i}(k)$, $r_i(k'')$ represents the original sequence used to generate sequence $r_i^{cell_i}(k)$, and k' is the index of the original sequence $r_i(k')$.

In accordance with an exemplary embodiment, there may be the following two possible ways to generate a RIM sequence:

Option 1: Generate a long sequence according to RIM-RS generation; and

Option 2: Generate a sequence of fixed length first, and then perform FDM of the sequence in frequency domain.

Figure 5A:
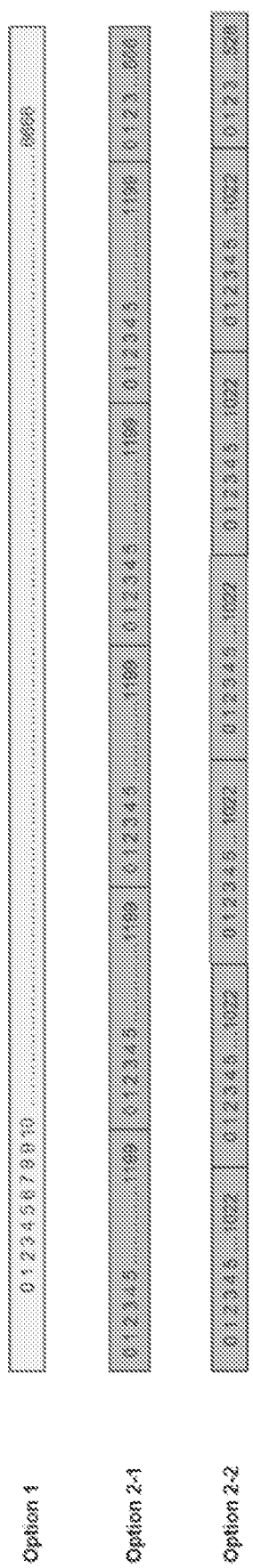
FIG. 5A is a diagram illustrating exemplary sequence generation according to some embodiments of the present disclosure.

FIG. 5A is a diagram illustrating exemplary sequence generation according to some embodiments of the present disclosure. Taking a frequency range of 100 MHz and the subcarrier spacing of 15 kHz as an example, a RIM sequence with length of 6667 may be generated according to Option 1, or according to Option 2-1 by using FDM of a sequence with length of 1200, or according to Option 2-2 by using FDM of a sequence with length of 1023, as shown in FIG. 5A. It can be appreciated that the sequence generation as illustrated in FIG. 5A are just examples, and the RIM sequence may also be generated in any other suitable ways.

Figure 5B:
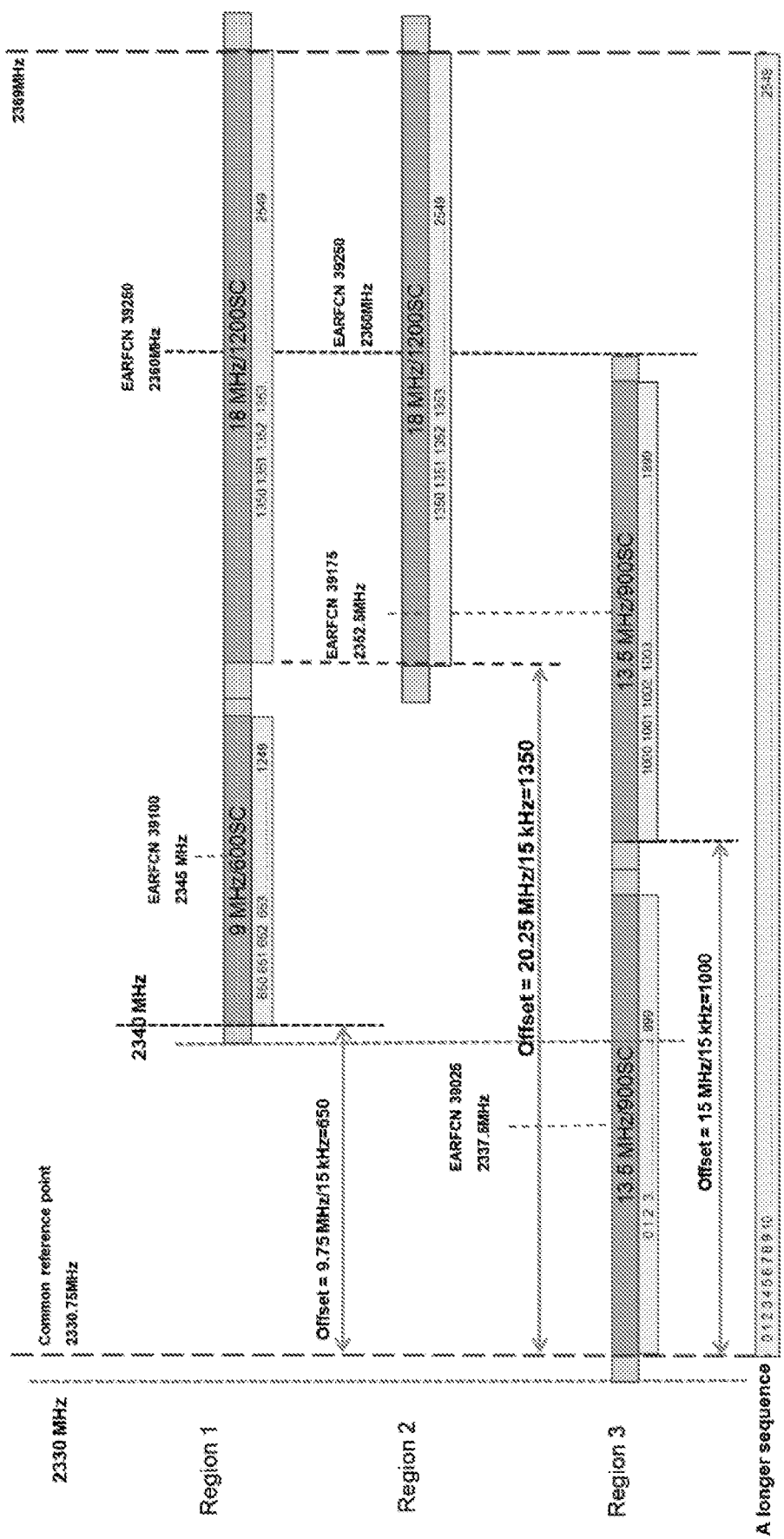
FIGS. 5B-5D are diagrams illustrating exemplary sequence mapping according to some embodiments of the present disclosure.
Figure 5C:
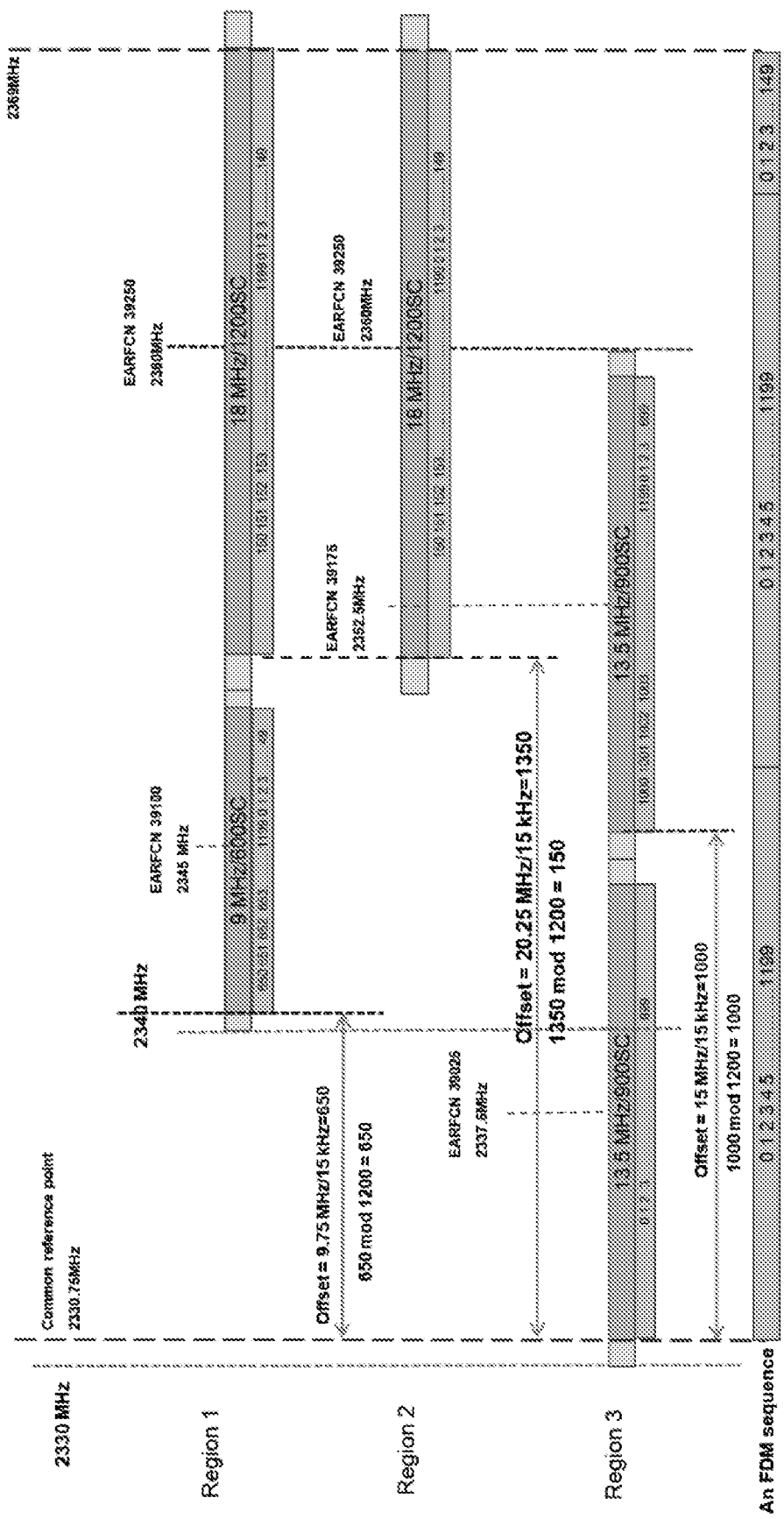
Figure 5D:
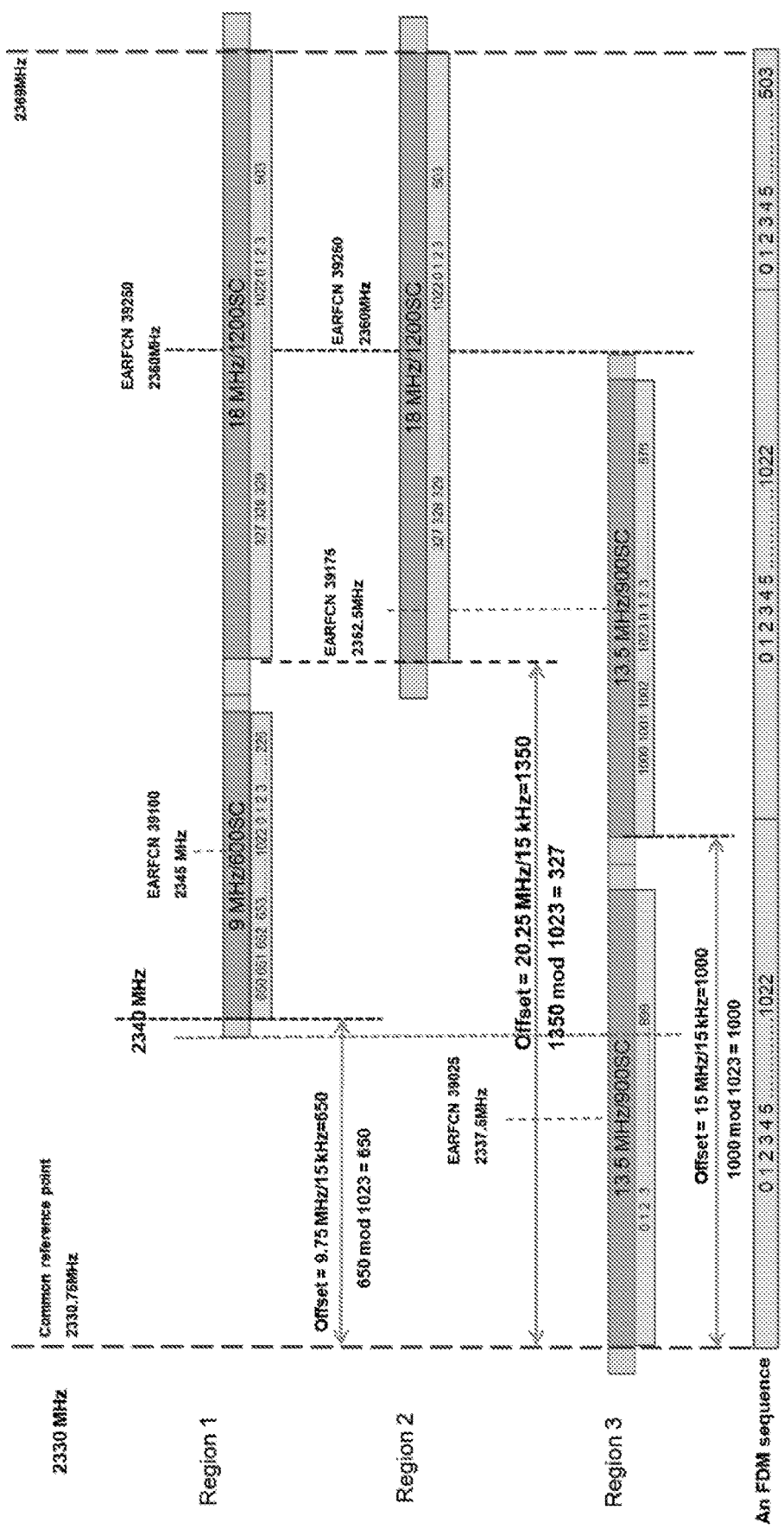

FIGS. 5B-5D are diagrams illustrating exemplary sequence mapping according to some embodiments of the present disclosure. Similar to FIG. 4, a common frequency reference point at 2330.75 MHz may be introduced to assist in determining the sequence mapping for different options of sequence generation as shown in FIGS. 5B-5D. Taking the subcarrier spacing of 15 kHz as an example, according to Option 1 of sequence generation shown in FIG. 5A, a longer sequence of length 2550 with continuous indexes (i.e., from 0 to 2549) may be mapped into subcarriers of a spectrum of 2330.75 MHz~2369 MHz, as shown in FIG. 5B. According to Option 2-1 of sequence generation shown in FIG. 5A, an FDM sequence of length 2550 with noncontinuous indexes (including a first part of 0~4199, a second part of 0~4199 and the third part of 0~449) may be mapped into subcarriers of a spectrum of 2330.75 MHz~2369 MHz, as shown in FIG. 5C. If Option 2-2 of sequence generation shown in FIG. 5A is used, an FDM sequence of length 2550 with noncontinuous indexes (including a first part of 0~4022, a second part of 0~4022 and the third part of 0~503) may be mapped into subcarriers of a spectrum of 2330.75 MHz~2369 MHz, as shown in FIG. 5D.

It can be appreciated that the parameter names (e.g., $\Delta_{inter-cell}^{freq}$, $\Delta_{inter-cell}^{EARFCN}$, $\Delta F_{SCS}$, $k_{start}$, etc.) and the corresponding values (e.g., $\Delta F_{SCS}$=15 kHz/30 kHz) used herein are exemplary, and other parameter names and values may also be used to indicate the same or similar information. In addition, it can be appreciated that algorithms, functions and variables related to the configuration of subcarrier/sequence alignment as described in connection with formulas (1)~(11) and FIG. 3, FIG. 4 and FIGS. 5A-5D are just examples, and other suitable algorithms, functions, variables and the associated values thereof may also be applicable for implementing the proposed methods.

It is noted that some embodiments of the present disclosure are mainly described in relation to 4G/LTE or 5G/NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 6:
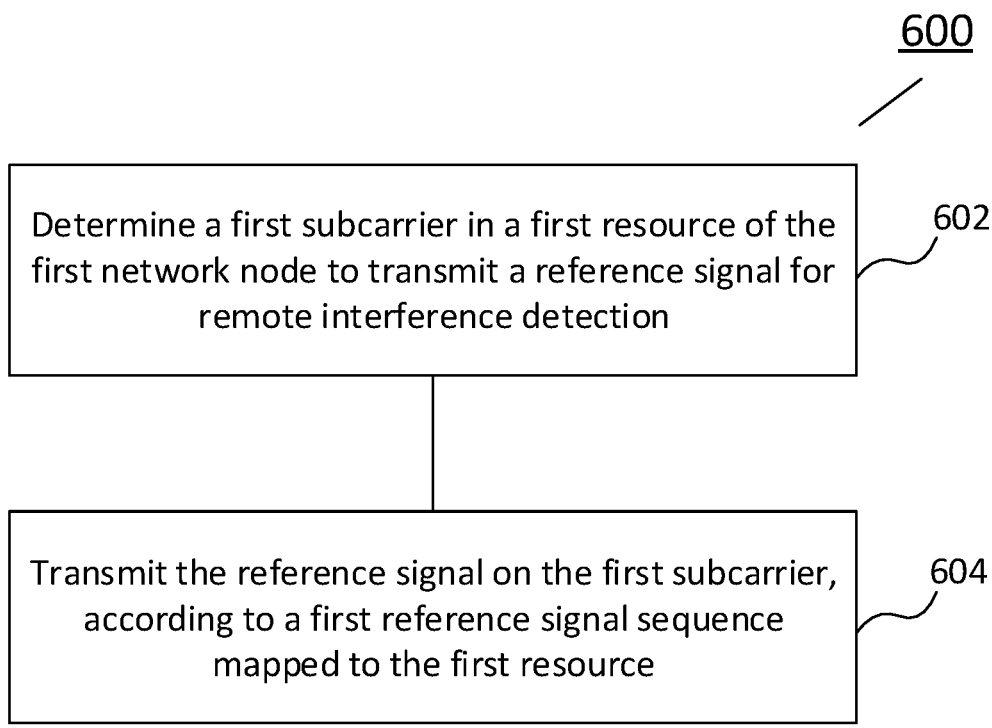
FIG. 6 is a flowchart illustrating a method according to some embodiments of the present disclosure.

FIG. 6 is a flowchart illustrating a method 600 according to some embodiments of the present disclosure. The method 600 illustrated in FIG. 6 may be performed by a first network node or an apparatus communicatively coupled to the first network node. In accordance with an exemplary embodiment, the first network node may comprise a base station, an AP, a cell or any other suitable entity that may be capable of serving one or more terminal devices such as UEs according to specific communication protocols.

According to the exemplary method 600 illustrated in FIG. 6, the first network node may determine a first subcarrier in a first resource of the first network node to transmit a reference signal for remote interference detection, as shown in block 602. The first subcarrier may be aligned with a second subcarrier in a second resource of a second network node. In accordance with an exemplary embodiment, the first network node may transmit the reference signal on the first subcarrier, according to a first reference signal sequence mapped to the first resource, as shown in block 604. In an overlapped part of the first resource and the second resource, the first reference signal sequence may be aligned with a second reference signal sequence mapped to the second resource.

In accordance with an exemplary embodiment, the first resource may overlap the second resource partially, e.g., as shown in FIG. 1C. It can be appreciated that the bandwidth of the first network node may be different from the bandwidth of the second network node. In another embodiment, the first resource may totally overlap the second resource, e.g., as shown in FIG. 1B.

In accordance with an exemplary embodiment, the first resource and the second resource may be aligned on subcarriers. In this case, resource configurations (e.g., about central frequency, EARFCN, NR-ARFCN, etc.) of the first network node and the second network node may be determined according to formulas (4), (7) and/or (8).

In accordance with an exemplary embodiment, the first reference signal sequence and the second reference signal sequence may have the same sequence index per subcarrier in the overlapped part of the first resource and the second resource, e.g., as shown in Configuration 1 and Configuration 3 of FIG. 3.

In accordance with an exemplary embodiment, the first resource may correspond to a first central frequency and the second resource may correspond to a second central frequency. The second central frequency may have a first offset (e.g., $\Delta_{inter-cell}^{freq}$, etc.) with respect to the first central frequency by an integer multiple of a subcarrier spacing for the remote interference detection, e.g., as shown in formula (4).

In accordance with an exemplary embodiment, the first resource may correspond to a first ARFCN and the second resource may correspond to a second ARFCN. The second ARFCN may have a second offset (e.g., $\Delta_{inter-cell}^{EARFCN}$, etc.) with respect to the first ARFCN, and the second offset may be determined based at least in part on a channel raster value (e.g., 100 kHz, etc.) and the first offset, e.g., as shown in formula (7).

In accordance with an exemplary embodiment, the first network node and the second network node may have a common frequency reference point (e.g., as shown in FIG. 4 and FIGS. 5B-5D) to determine a first central frequency of the first resource and a second central frequency of the second resource.

In accordance with an exemplary embodiment, the first central frequency may have a first frequency difference from the common frequency reference point by an integer multiple of a subcarrier spacing for the remote interference detection. Similarly, the second central frequency may have a second frequency difference from the common frequency reference point by an integer multiple of the subcarrier spacing for the remote interference detection.

In accordance with an exemplary embodiment, the first reference signal sequence may have a first start sequence index based at least in part on the common frequency reference point, e.g., as shown in formulas (9) and (10). Similarly, the second reference signal sequence may have a second start sequence index based at least in part on the common frequency reference point, e.g., as shown in formulas (9) and (10).

In accordance with an exemplary embodiment, the first reference signal sequence may be obtained according to RIM-RS generation, e.g., as shown in Option 1 of FIG. 5A. Similarly, the second reference signal sequence may be obtained according to RIM-RS generation. In accordance with another exemplary embodiment, the first reference signal sequence may be obtained by performing FDM on a first fixed-length sequence, e.g., as shown in Option 2-1 and Option 2-2 of FIG. 5A. Similarly, the second reference signal sequence may be obtained by performing FDM on a second fixed-length sequence. It can be appreciated that the first fixed-length sequence and the second fixed-length sequence may be the same sequence.

Figure 7:
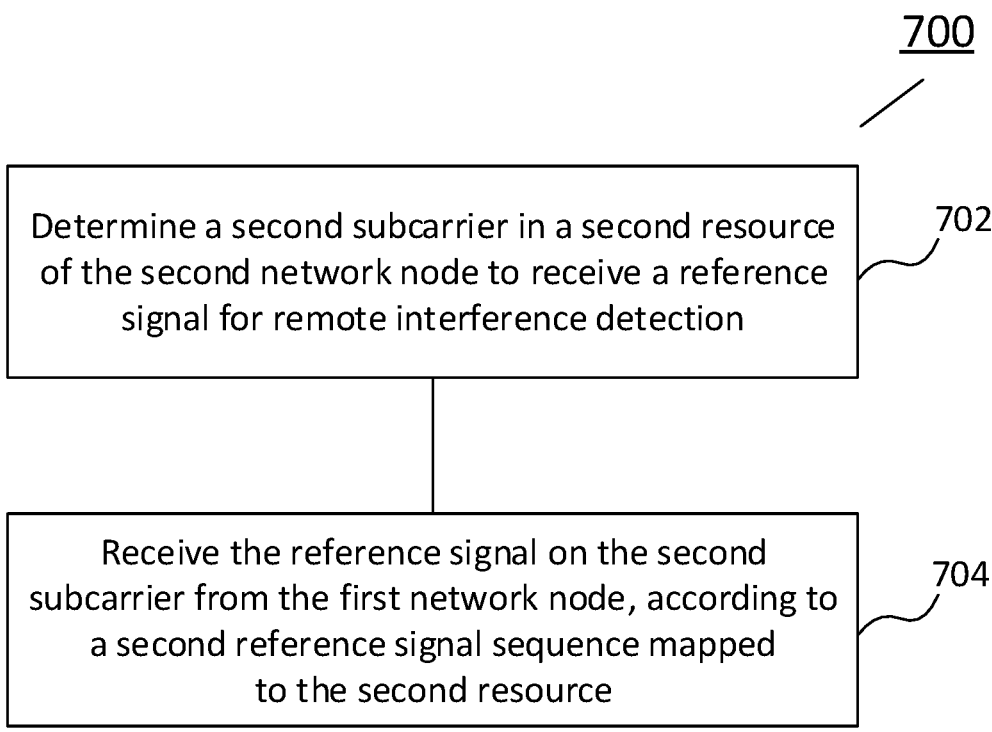
FIG. 7 is a flowchart illustrating another method according to some embodiments of the present disclosure.

FIG. 7 is a flowchart illustrating a method 700 according to some embodiments of the present disclosure. The method 700 illustrated in FIG. 7 may be performed by a second network node or an apparatus communicatively coupled to the second network node. In accordance with an exemplary embodiment, the second network node may comprise a base station, an AP, a cell or any other suitable entity that may be capable of serving one or more terminal devices such as UEs according to specific communication protocols.

According to the exemplary method 700 illustrated in FIG. 7, the second network node may determine a second subcarrier in a second resource of the second network node to receive a reference signal for remote interference detection, as shown in block 702. The second subcarrier may be aligned with a first subcarrier in a first resource of a first network node (e.g., the first network node as described with respect to FIG. 6). In accordance with an exemplary embodiment, the second network node may receive the reference signal on the second subcarrier from the first network node, according to a second reference signal sequence mapped to the second resource, as shown in block 704. The second reference signal sequence may be aligned, in an overlapped part of the first resource and the second resource, with a first reference signal sequence mapped to the first resource.

It can be appreciated that the steps, operations and related configurations of the method 700 illustrated in FIG. 7 may correspond to the steps, operations and related configurations of the method 600 illustrated in FIG. 6. It also can be appreciated that the reference signal for remote interference detection as described with respect to FIG. 7 may correspond to the reference signal for remote interference detection as described with respect to FIG. 6. Thus, the resource configurations (e.g., about the first resource, the first subcarrier and the first reference signal sequence, etc.) of the first network node as described with respect to the method 600 and method 700 may have the same or similar contents and feature elements. Similarly, the resource configurations (e.g., about the second resource, the second subcarrier and the second reference signal sequence, etc.) of the second network node as described with respect to the method 600 and method 700 may have the same or similar contents and feature elements.

It can be appreciated that although operations of a transmitter of a reference signal for remote interference detection are described with respect to the first network node, operations of a receiver of the reference signal for remote interference detection may also be implemented by the first network node. Thus, the method 700 illustrated in FIG. 7 may also be performed by the first network node. Similarly, it can be appreciated that although operations of a receiver of a reference signal for remote interference detection are described with respect to the second network node, operations of a transmitter of the reference signal for remote interference detection may also be implemented by the second network node. Thus, the method 600 illustrated in FIG. 6 may also be performed by the second network node.

Various exemplary embodiments according to the present disclosure may enable remote interference detection in different scenarios, e.g., when spectrums configured for two cells have different bandwidths while being aligned on subcarriers. In accordance with an exemplary embodiment, a common frequency reference point may be introduced to make the spectrums of the two cells aligned on subcarriers. In accordance with another exemplary embodiment, the EARFCN/NR-ARFCN may be configured or selected so that there is no frequency offset between a transmitter and a receiver of a RIM-RS. In addition, the RIM sequence mapping according to exemplary embodiments may enable sequence alignment in the overlapped resource part of two cells. Application of various embodiments can advantageously improve performance of remote interference detection and enhance flexibility of network resource configuration.

The various blocks shown in FIGS. 6-7 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8A:
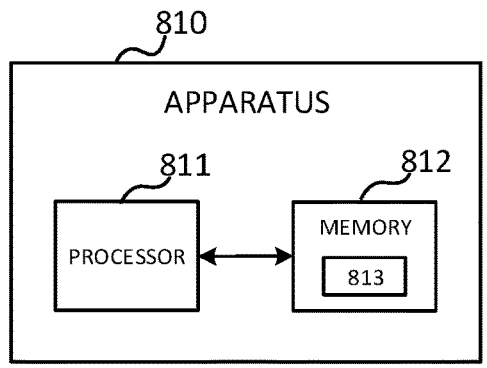
FIG. 8A is a block diagram illustrating an apparatus according to some embodiments of the present disclosure.

FIG. 8A is a block diagram illustrating an apparatus 810 according to various embodiments of the present disclosure. As shown in FIG. 8A, the apparatus 810 may comprise one or more processors such as processor 811 and one or more memories such as memory 812 storing computer program codes 813. The memory 812 may be non-transitory machine/processor/computer readable storage medium. In accordance with some exemplary embodiments, the apparatus 810 may be implemented as an integrated circuit chip or module that can be plugged or installed into a first network node as described with respect to FIG. 6, or a second network node as described with respect to FIG. 7. In such case, the apparatus 810 may be implemented as a first network node as described with respect to FIG. 6, or a second network node as described with respect to FIG. 7.

In some implementations, the one or more memories 812 and the computer program codes 813 may be configured to, with the one or more processors 811, cause the apparatus 810 at least to perform any operation of the method as described in connection with FIG. 6. In other implementations, the one or more memories 812 and the computer program codes 813 may be configured to, with the one or more processors 811, cause the apparatus 810 at least to perform any operation of the method as described in connection with FIG. 7. Alternatively or additionally, the one or more memories 812 and the computer program codes 813 may be configured to, with the one or more processors 811, cause the apparatus 810 at least to perform more or less operations to implement the proposed methods according to the exemplary embodiments of the present disclosure.

Figure 8B:
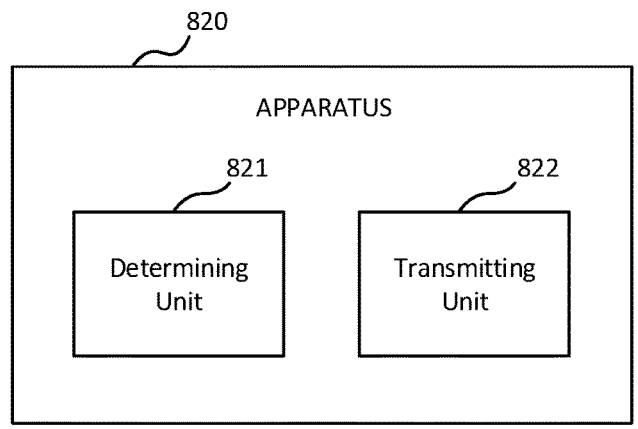
FIG. 8B is a block diagram illustrating another apparatus according to some embodiments of the present disclosure.

FIG. 8B is a block diagram illustrating an apparatus 820 according to some embodiments of the present disclosure. As shown in FIG. 8B, the apparatus 820 may comprise a determining unit 821 and a transmitting unit 822. In an exemplary embodiment, the apparatus 820 may be implemented in a first network node such as a base station. The determining unit 821 may be operable to carry out the operation in block 602, and the transmitting unit 822 may be operable to carry out the operation in block 604. Optionally, the determining unit 821 and/or the transmitting unit 822 may be operable to carry out more or less operations to implement the proposed methods according to the exemplary embodiments of the present disclosure.

Figure 8C:
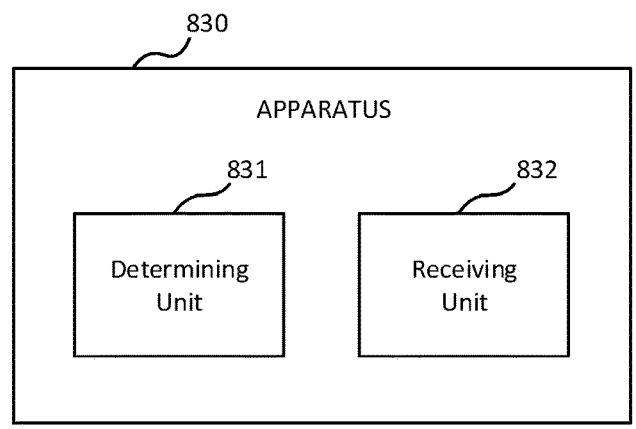
FIG. 8C is a block diagram illustrating a further apparatus according to some embodiments of the present disclosure.

FIG. 8C is a block diagram illustrating an apparatus 830 according to some embodiments of the present disclosure. As shown in FIG. 8C, the apparatus 830 may comprise a determining unit 831 and a receiving unit 832. In an exemplary embodiment, the apparatus 830 may be implemented in a second network node such as a base station. The determining unit 831 may be operable to carry out the operation in block 702, and the receiving unit 832 may be operable to carry out the operation in block 704. Optionally, the determining unit 831 and/or the receiving unit 832 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first network node, comprising:
   determining a first subcarrier in a first resource of the first network node to transmit a reference signal for remote interference detection, wherein the first subcarrier is aligned with a second subcarrier in a second resource of a second network node; and
   transmitting the reference signal on the first subcarrier, according to a first reference signal sequence mapped to the first resource, wherein the first reference signal sequence is aligned, in an overlapped part of the first resource and the second resource, with a second reference signal sequence mapped to the second resource;
   wherein the first resource corresponds to a first central frequency and the second resource corresponds to a second central frequency, and wherein the second central frequency has a first offset with respect to the first central frequency by an integer multiple of a subcarrier spacing for the remote interference detection, and
   wherein the first resource corresponds to a first absolute radio frequency channel number and the second resource corresponds to a second absolute radio frequency channel number which has a second offset, $\Delta_{inter-cell}^{EARFCN}$ with respect to the first absolute radio frequency channel number, and wherein the second offset is determined based at least in part on the first offset and a channel raster value of 100 kHz and wherein the second offset is an integer multiple of 3.

2. The method according to claim 1, wherein the first resource overlaps the second resource partially.

3. The method according to claim 1, wherein the first reference signal sequence and the second reference signal sequence have a same sequence index per subcarrier in the overlapped part of the first resource and the second resource.

4. The method according to claim 1, wherein the first network node and the second network node have a common frequency reference point to determine a first central frequency of the first resource and a second central frequency of the second resource.

5. The method according to claim 4, wherein the first central frequency has a first frequency difference from the common frequency reference point by an integer multiple of a subcarrier spacing for the remote interference detection, and the second central frequency has a second frequency difference from the common frequency reference point by an integer multiple of the subcarrier spacing for the remote interference detection.

6. The method according to claim 4, wherein the first reference signal sequence has a first start sequence index based at least in part on the common frequency reference point.

7. The method according to claim 4, wherein the second reference signal sequence has a second start sequence index based at least in part on the common frequency reference point.

8. The method according to claim 1, wherein the first reference signal sequence is obtained according to remote interference management reference signal generation, or by performing frequency division multiplexing on a first fixed-length sequence.

9. The method according to claim 1, wherein the second reference signal sequence is obtained according to remote interference management reference signal generation, or by performing frequency division multiplexing on a second fixed-length sequence.

10. A first network node, comprising:
one or more processors; and
one or more memories comprising computer program codes,
the one or more memories and the computer program codes configured to, with the one or more processors, cause the first network node at least to:
determine a first subcarrier in a first resource of the first network node to transmit a reference signal for remote interference detection, wherein the first subcarrier is aligned with a second subcarrier in a second resource of a second network node; and
transmit the reference signal on the first subcarrier, according to a first reference signal sequence mapped to the first resource, wherein the first reference signal sequence is aligned, in an overlapped part of the first resource and the second resource, with a second reference signal sequence mapped to the second resource;
wherein the first resource corresponds to a first central frequency and the second resource corresponds to a second central frequency, and wherein the second central frequency has a first offset with respect to the first central frequency by an integer multiple of a subcarrier spacing for the remote interference detection, and
wherein the first resource corresponds to a first absolute radio frequency channel number and the second resource corresponds to a second absolute radio frequency channel number which has a second offset, $\Delta_{inter-cell}^{EARFCN}$ with respect to the first absolute radio frequency channel number, and wherein the second offset is determined based at least in part on the first offset and a channel raster value of 100 kHz and wherein the second offset is an integer multiple of 3.

11. A method performed by a second network node, comprising:
determining a second subcarrier in a second resource of the second network node to receive a reference signal for remote interference detection, wherein the second subcarrier is aligned with a first subcarrier in a first resource of a first network node; and
receiving the reference signal on the second subcarrier from the first network node, according to a second reference signal sequence mapped to the second resource, wherein the second reference signal sequence is aligned, in an overlapped part of the first resource and the second resource, with a first reference signal sequence mapped to the first resource;
wherein the first resource corresponds to a first central frequency and the second resource corresponds to a second central frequency, and wherein the second central frequency has a first offset with respect to the first central frequency by an integer multiple of a subcarrier spacing for the remote interference detection, and
wherein the first resource corresponds to a first absolute radio frequency channel number and the second resource corresponds to a second absolute radio frequency channel number which has a second offset, $\Delta_{inter-cell}^{EARFCN}$ with respect to the first absolute radio frequency channel number, and wherein the second offset is determined based at least in part on the first offset and a channel raster value of 100 kHz and wherein the second offset is an integer multiple of 3.

12. The method according to claim 11, wherein the first resource overlaps the second resource partially.

13. The method according to claim 11, wherein the first reference signal sequence and the second reference signal sequence have a same sequence index per subcarrier in the overlapped part of the first resource and the second resource.

14. The method according to claim 11, wherein the first network node and the second network node have a common frequency reference point to determine a first central frequency of the first resource and a second central frequency of the second resource.

15. The method according to claim 14, wherein the first central frequency has a first frequency difference from the common frequency reference point by an integer multiple of a subcarrier spacing for the remote interference detection, and the second central frequency has a second frequency difference from the common frequency reference point by an integer multiple of the subcarrier spacing for the remote interference detection.

16. The method according to claim 14, wherein the first reference signal sequence has a first start sequence index based at least in part on the common frequency reference point.

* * * * *